April 8, 1958 W. H. DAILEY, JR., ET AL 2,829,954
APPARATUS FOR ANALYZING GAS
Filed Nov. 30, 1954 4 Sheets-Sheet 1
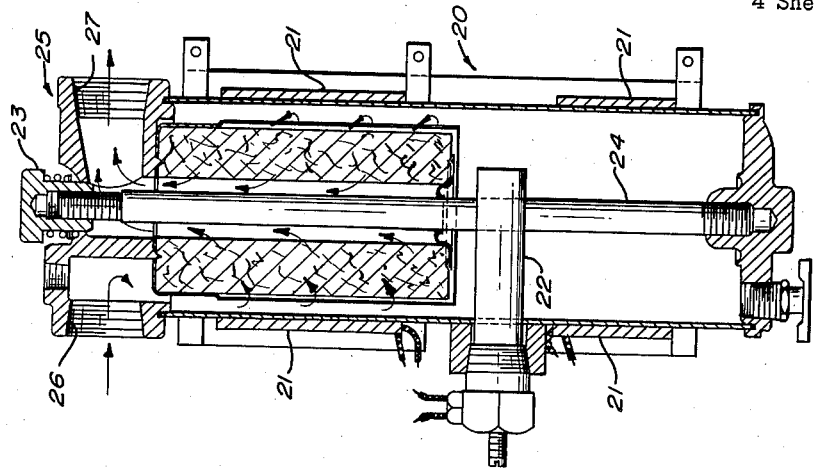
Fig-III
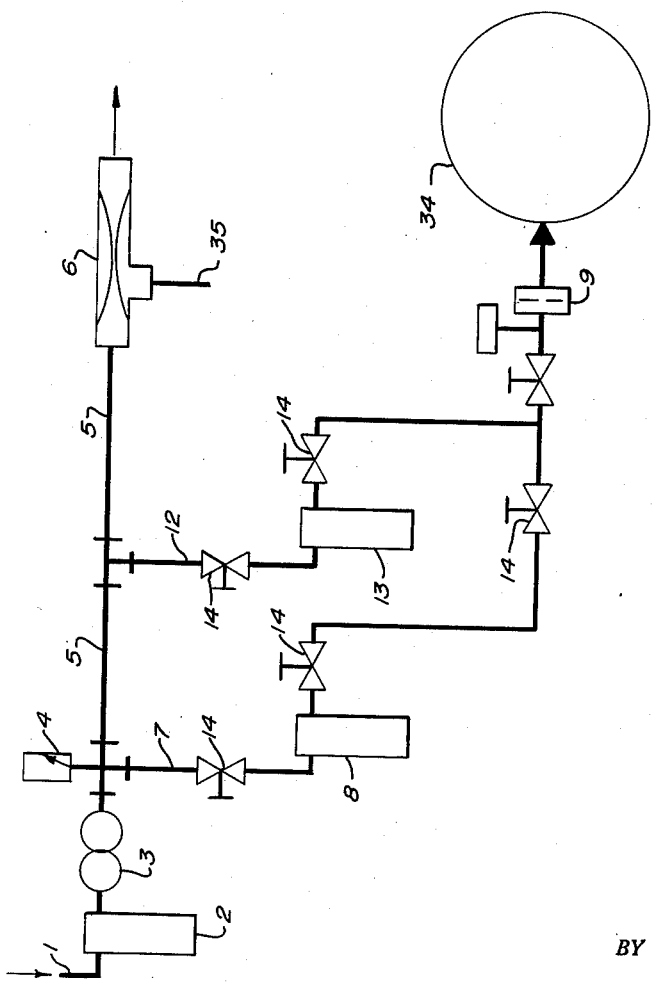
Fig-I
INVENTORS
WILLIAM H. DAILEY JR.
BY JOHN W. CARTER
Charles S. Haughey
ATTORNEY

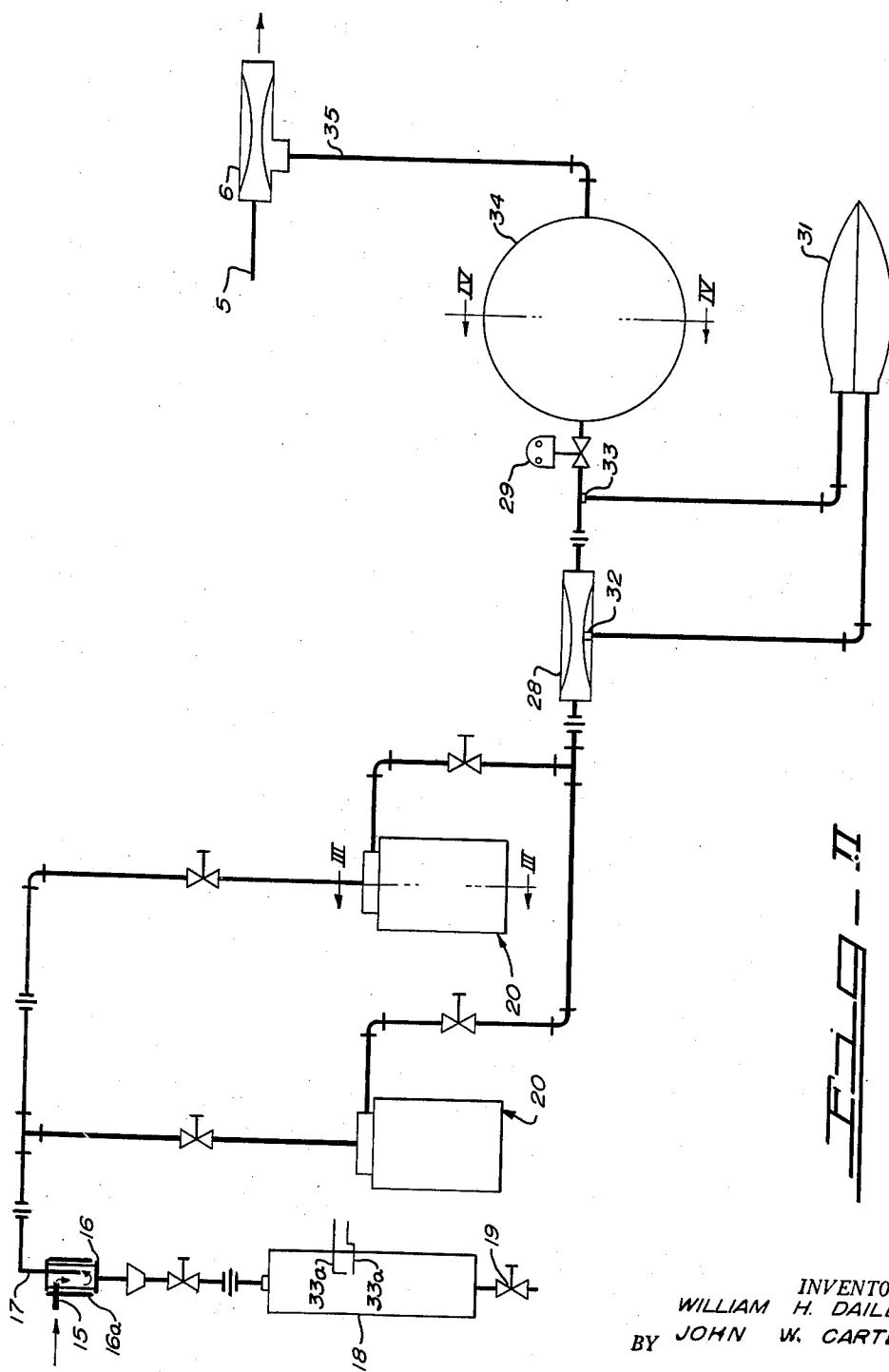

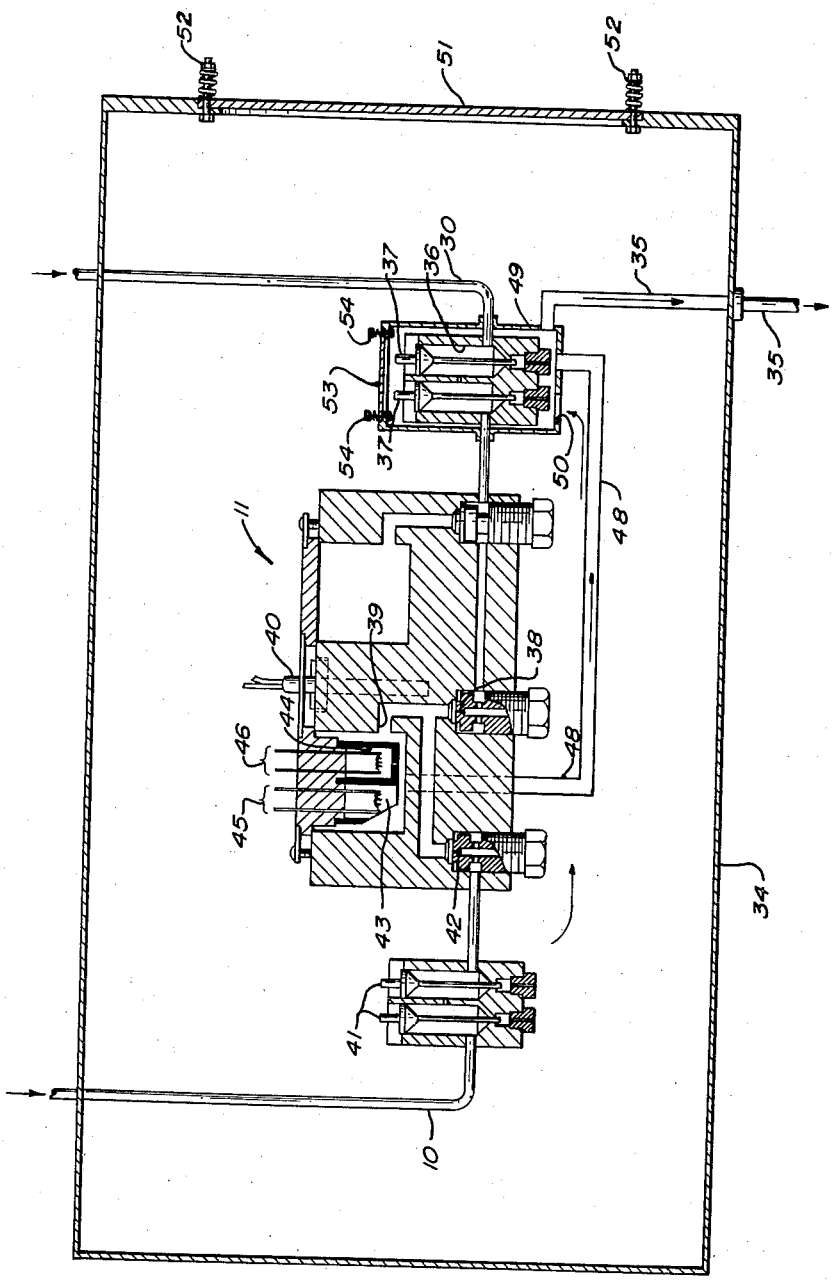

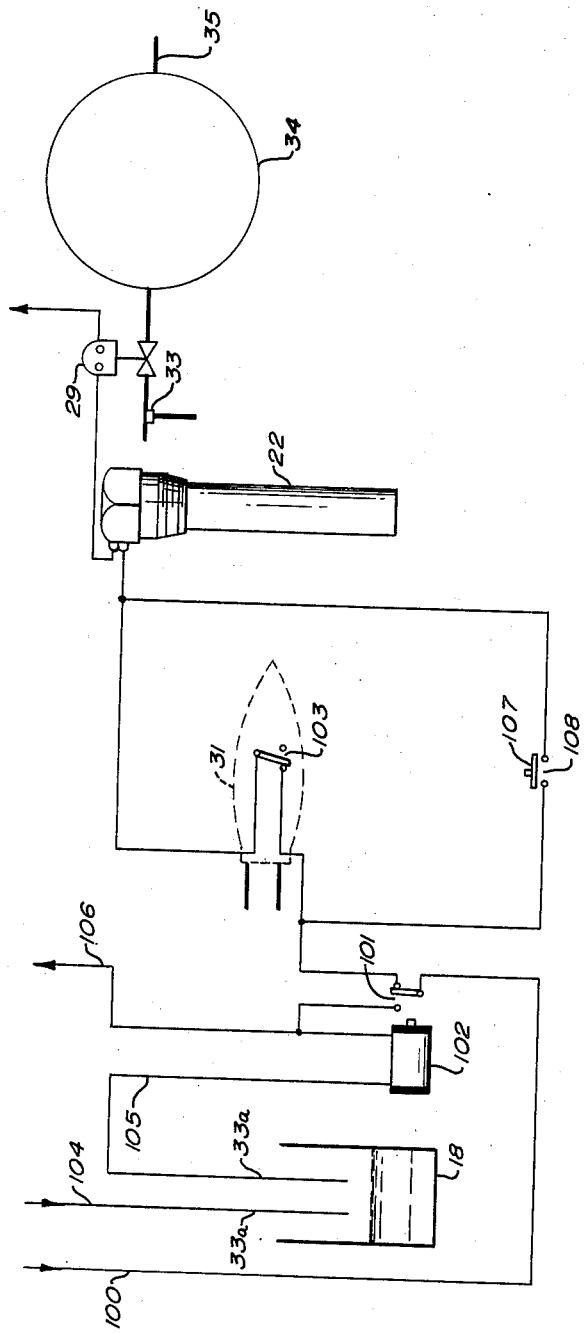
INVENTORS
WILLIAM H. DAILEY JR.
BY JOHN W. CARTER
Charles S. Haughey
ATTORNEY

United States Patent Office 2,829,954
Patented Apr. 8, 1958

2,829,954

APPARATUS FOR ANALYZING GAS

William H. Dailey, Jr., and John W. Carter, Toledo, Ohio, assignors to Surface Combustion Corporation, Toledo, Ohio, a corporation of Ohio Application November 30, 1954, Serial No. 472,014

17 Claims. (Cl. 23—255)

This invention relates to combustion control systems, and more particularly to apparatus for sampling and analyzing gas contaminated with free moisture and finely divided solids.

Such apparatus is especially applicable for controlling combustion equipment for high temperature heating furnaces such as soaking pits in steel mills. The mixture of by-product gases available in a steel mill has a variable composition and may include gases exhausted from blast furnaces and gases produced in coke ovens, the calorific value of the former gases being relatively low, and the calorific value of the latter gases being relatively high. Because of the variations in the amounts of blast furnace gas and coke oven gas which are available at various times, the mixture of by-product gases that is burned as a fuel in steel mills has a widely varying calorific value. Every time the calorific value of fuel gas changes, there is a corresponding change in the proportion of air required for efficient combustion of the fuel gas. The ratio of air to fuel gas is very critical, since excess air cools off the furnace and excess fuel gas is, of course, expensive and creates dangerous conditions, e. g., the excess fuel gas ignites and burns as it comes out of covers and stacks.

Heretofore, attempts have been made to constantly withdraw sample gas from the fuel gas to be burned and to conduct such sample gas to an analyzer for constantly determining the calorific value of the fuel gas to be burned, the analyzer controlling a fuel-air ratio regulator. Such attempts have failed for several reasons. The prior art sampling systems could not deliver a true gas sample to the analyzer and could not cope with the water, acids and finely divided solids contained in fuel gases and soon became inoperative. For example, fuel gas lines, especially from blast furnaces, ordinarily carry gas at at least 110° F. saturated with moisture which in condensed form often floods sampling systems. Furthermore, the prior art analyzing systems could not be operated without either contaminating the gas sample and thus changing its characteristics or, if modified to operate without contaminating the gas sample, could not be safely operated to constantly and accurately analyze highly combustible fuel gas.

The principal object of this invention is to provide apparatus for sampling and analyzing gas contaminated with free moisture and finely divided solids, the apparatus functioning without contaminating the gas sample and safely and accurately measuring the calorific value of a true gas sample. More specific objects and advantages are apparent from the following description, in which reference is had to the accompanying drawings illustrating a preferred embodiment of the invention.

Figure I of the drawings illustrates diagrammatically the air flow through an improved gas sampling and purifying system.

Figure II illustrates diagrammatically the sample gas flow through the improved gas sampling and purifying system.

Figure III is an enlarged and detailed vertical sectional view of a heated filter taken along the line III—III of Figure II, showing the flow of sample gas through the cartridge of the filter.

Figure IV is an enlarged and detailed vertical sectional view taken along the line IV—IV of Figure II representing a schematic view through the principal parts of a combustibles analyzer enclosed within a vacuum system.

Figure V is a schematic wiring diagram of a safety control circuit for the apparatus.

These specific drawings and the specific description that follows merely disclose and illustrate the invention, and are not intended to impose limitations upon the claims.

Apparatus embodying the invention for analyzing gas contaminated with free moisture and finely divided solids includes a sampling line connected to a supply of the gas to be analyzed, an eliminator of nongaseous contaminants, said eliminator being connected to the sampling line and comprising a passage having an abrupt change in direction, a moisture trap connected below the eliminator, a filter connected to the eliminator for removing finely divided solids from the gas, means for heating the gas passing through the system to a temperature above the dew point of the gas, an analyzer connected to the filter, and a pump for creating a vacuum to draw the gas through the sampling line, eliminator, filter and analyzer.

Referring to Figure I, apparatus for analyzing a gas contaminated with free moisture and finely divided solids includes an air supply system comprising an atmospheric air inlet 1 leading to an incoming air filter 2. An ordinary pump 3 forces the air through a relief valve and pressure regulator 4 which divides the stream of air, one part flowing through a line 5 to provide power air for a sample gas jet pump or eductor 6 and the other part flowing through a branch line 7, an air filter 8 and a flow limiting orifice 9 to provide power air to a compressed air inlet 10 of a combustibles analyzer 11 (Figure IV) for constantly determining the calorific value of the sample gas. A stand by branch line 12 having an air filter 13 is used instead of the branch line 7 and its air filter 8 when the line 7 or its air filter 8 are cleaned or replaced, hand valves 14 being provided in the lines 7 and 12 for making the changeover.

The apparatus also includes a gas sampling and purifying system comprising a sampling line 15 connected to a supply of the fuel gas to be analyzed. The sampling line 15 is connected to the jet pump 6 which creates a vacuum drawing the sample gas constantly through the sampling and purifying system and through the analyzer 11. However, any suitable means which does not change characteristics of the sample may be used to propel or draw the sample gas through the system. It is possible for the analyzing apparatus to function by withdrawing a small sample at frequent intervals, but ordinarily the apparatus functions by withdrawing a small continuous stream of the fuel gas.

The gas to be analyzed flows through an eliminator 16 of nongaseous contaminants surrounded by a heater 16a for heating the gas sample passing through the system to a temperature above the dew point of the gas. The gas sample must be heated to a temperature above its dew point to re-evaporate the moisture contained in the sample so that the true gas sample measured in the combustibles analyzer 11 will be representative of the gas which is subsequently burned and metered in the combustion system. The heater 16a is controlled by an ordinary thermostat (not shown) to maintain a temperature in the gas sample such that all moisture entering the sampling line 15 in droplet form will be vaporized, and the gas sample, as measured in the combustibles analyzer 11, will be handled on a wet basis. The eliminator 16 comprises a passage having an abrupt change in direction, the gas flowing upward through a line 17, as indicated by the arrows in Figure II, while liquid water and other non-gaseous contaminants drop downward into a large trap sump 18 connected below the eliminator 16. Waste water is drained at required intervals from the sump 18 through a hand valve 19. Fuel gas lines, especially from blast furnaces, ordinarily carry gas at at least 110° F. saturated with moisture and suitable drain apparatus must be provided to protect the sampling and analyzing equipment from flooding by such moisture in condensed form.

The gas flows through the line 17 to either or both of a pair of special felt gas filters 20 for removing finely divided solids from the gas. Each gas filter 20 is equipped with a pair of band heaters 21 (Figure III) to maintain the gas sample at a control temperature above the dew point of the gas for the same reason as the heater 16a is provided for the eliminator 16, as hereinbefore described. Only one of the gas filters 20 is required for full operation, the other may be kept in stand by reserve.

One of the gas filters 20 is shown in vertical section and in enlarged detail in Figure III. The band heaters 21, controlled by an ordinary thermostat (not shown), operate a thermoswitch 22, the function of which is hereinafter described, and heat the gas sample as it flows through a cartridge in the path indicated by the arrows. The cartridge may be replaced when a nut 23 is removed from a threaded rod 24 and a member 25 having a threaded gas inlet 26 and a threaded gas outlet 27 is lifted from the top of the cartridge.

The clean true gas sample flows from the gas filters 20, through a metering element or venturi 28 for measuring the flow of gas passing through the system and through a solenoid operated, normally closed shutoff valve 29 to a gas sample inlet 30 of the combustibles analyzer 11 (Figure IV). A differential microswitch 31 is connected between a throat tap 32 in the metering element 28 and a down stream tap 33. If the gas flow, as measured by the metering element 28, drops below a minimum level, i. e., below that required for accurate operation of the metering element, the differential microswitch 31 opens its contacts breaking an electrical circuit, shown in Figure V and hereinafter described, to the solenoid of the normally closed shutoff valve 29 deenergizing the solenoid. Deenergization of the solenoid causes the normally closed shutoff valve 29 to close and interrupt the flow of the gas sample.

The solenoid of the shutoff valve 29 is also deenergized if the water level in the sump 18 rises sufficiently to cover a pair of electrodes 33a of an electrical sensing means located in the sump near its top. Covering of the electrodes 33a by the water level in the sump 18 makes an electrical connection between the electrodes. Deenergization of the solenoid causes the normally closed shutoff valve 29 to close avoiding flooding of the combustibles analyzer 11 in the event that excessive surges of liquid water enter the sampling line 15. The electrical circuit for causing deenergization of the solenoid of the shutoff valve 29, if the water level in the sump 18 covers the electrodes 33a, is shown in Figure V and hereinafter described.

The solenoid of the shutoff valve 29 cannot be energized to open the valve until whichever one of the gas filters 20 being used is heated to a control temperature above the dew point of the gas sample. The thermoswitches 22, one of which is shown in Figure III, located one in each of the gas filters 20 have contacts which close when the gas filters 20 reach the control temperature. Closing of the contacts conditions an electrical circuit, shown in Figure V, permitting the solenoid of the shutoff valve 29 to be energized. Energization of the solenoid causes the normally closed shutoff valve 29 to open.

A schematic wiring diagram of the safety control circuit is shown in Figure V. Current normally flows through a lead 100, contacts 101 of a relay 102, contacts 103 of the differential microswitch 31 and contacts of the thermoswitch 22 to the solenoid of the normally closed shutoff valve 29 to energize the solenoid, which opens the valve 29. The contacts in the thermoswitch 22 close when whichever one of the gas filters 22 being used reaches control temperature. The shutoff valve 29, thus, cannot be opened unless the gas filters are at control temperature.

The contacts 103 of the differential microswitch 31 are pressure closed in the position shown in Figure V when the gas sample flow, as measured by the metering element 28, is that required for accurate operation of the metering element. When the gas flow drops below that required for accurate operation, the contacts 103 open breaking the circuit to the solenoid of the shutoff valve 29 deenergizing the solenoid. Deenergization of the solenoid causes the normally closed shutoff valve 29 to close.

A second source of power is provided for a lead 104 connected to one of the electrodes 33a. When an electrical connection is completed between the electrodes 33a by the water level in the sump 18 covering the ends of the electrodes, current flows through a lead 105 to the coil of the relay 102 opening its contacts 101 and breaking the circuit to the solenoid of the shutoff valve 29 deenergizing the solenoid, current then flows through a lead 106.

In case of a general power failure, the solenoid of the shutoff valve 29 is deenergized and the normally closed valve 29 fails safe. Of course, if the valve 29 should close for any reason, no pressure differential would exist between the throat tap 32 in the metering element 28 and the down stream tap 33 to pressure close the contacts 103 of the differential microswitch 31, i. e., when the contacts 103 are open the normally closed valve 29 cannot be opened and at the same time when the valve 29 is closed the contacts 103 cannot be closed. In such a case, a normally open starting control button 107 is pushed to shunt current through contacts 108 around the differential microswitch 31 opening the valve 29 and starting the flow of sample gas to again close the contacts 103 of the microswitch.

The gas sampling and purifying system must be operated at high temperatures to maintain the gas sample above its dew point and so that finely divided solids will be satisfactorily filtered from the gas sample by the gas filters 20 which are of the micronic type. Ordinary sampling pumps cannot operate continuously under the necessary high temperature conditions. No lubricants may be used in such pumps, since lubricants contaminate the gas sample. The jet pump 6 needs no lubricants and is provided to draw the gas sample through the gas sampling and purifying system and through the combustibles analyzer 11 with enough force to overcome the pressure drop through the small lines and felt filters.

The jet pump 6 is connected to the combustibles analyzer 11 by means of a primary vacuum enclosure 34 within which the analyzer is suitably mounted (Figure IV). The jet pump 6 is connected to the enclosure 34 through an exhauster or line 35 and continuously maintains a vacuum within the enclosure. A sample chamber 36 in the combustibles analyzer 11 is connected to the gas sampling and purifying system through the gas inlet 30 and a gas sample continuously enters the chamber under the influence of the vacuum. Two gas pressure regulating valves 37 arranged in series control the pressure of the sample gas entering the chamber 36. The regulating valves 37 form loosely fitting pistons for the cylinders in which they are housed and float on the sample gas steam rising and falling to exhaust sample gas to the vacuum so that a constant pressure is maintained to the chamber 36.

At the constant pressure established by the regulating valves 37, the gas sample passes through a sample orifice 38, which maintains a constant rate of flow. At the discharge side of the orifice 38, the sample gas is combined with compressed air and a combustible mixture of gas and air enters a combustion tube 39 at a constant temperature maintained by a heater 40. The air supply system comprises two air pressure regulating valves 41 and an air flow control orifice 42. The air pressure regulating valves 41 are like the gas pressure regulating valves 37 and operate in the same manner. The mixture of sample gas and air enters an analyzing cell 43 and a compensating filament cell 44. In each cell, combustion of the mixture takes place due to the initial temperature of a measuring filament 45 and a compensating filament 46. The temperature rise and the resulting increase in resistance of the measuring filament 45 is proportional to the amount of combustibles present in the gas sample.

After combustion, gases are exhausted from the analyzer 11 through a discharge tube 48 communicating with a secondary vacuum enclosure or hood 49 surrounding the sample chamber 36 and its pressure regulating valves 37. The gases exhausted from the analyzer together with sample gas exhausted from the valves 37 are drawn from the hood 49 by the action of the jet pump 6 which communicates with the hood 49 through the exhauster 35. The hood 49 is provided so that all fuel or fuel mixture components are directly vented through the smallest possible cover as a safety precaution.

The air pressure regulating valves 41 vent a constant and positive flow of air to the primary vacuum enclosure 34. This supply of air is vital to the system and must be constantly supplied from the valves 41 or any other means for supplying a flow of air to the enclosure 34. The constant flow of air from the valves 41 follows the path indicated by the arrows in Figure IV and passes on through a relatively large vent 50 in the hood 49 to purge the enclosure 34 of combustible gases. The vent 50 must be sufficiently large so that the pressure within and without the hood 49 are identical, thus allowing the gas pressure regulating valves 37 and the air pressure regulating valves 41 to vent to a common pressure. The constant purging of the enclosure 34 with air positively assures that only the very smallest volume, i. e., the space underneath the hood 49, can ever be filled with a combustible or explosive mixture.

The electrical output of the analyzer 11 is transmitted to a controller (not shown) which governs a fuel-air ratio regulator to regulate the proportion of air that is mixed with the fuel gas from which the sample gas was taken so that the proportion of air in the air-gas mixture that is supplied to a burner is always the correct ratio for most efficient combustion. Although a combustibles analyzer is specifically shown in Figure IV, the sample gas may be burned in the combustion tube 39 with either excess air or deficient air and the flue products analyzed by either an oxygen recorder or combustibles analyzer with the results expressed as B. t. u. per cubic foot. The present invention is not concerned with the specific design of the analyzer, but rather to the vacuum system and to the gas sampling and purifying system for supplying a clean sample on a wet basis to the analyzer.

As protection against explosions, a removable back 51 of the primary vacuum enclosure 34 is retained in place by spring operated bolts 52 and a removable cover 53 of the hood 49 is retained in place by spring operated bolts 54 so that an explosion can momentarily lift the back and the cover off their seats opening the primary enclosure to the atmosphere and the hood to the primary enclosure thus relieving explosion pressure without damage. After such an explosion, the back 51 and the cover 53 resiliently return to their normal positions and the apparatus resumes its normal operation. It is to be undersood that Figure IV is an exaggerated drawing representing a schematic view through the principal parts of the combustibles analyzer 11 enclosed within the vacuum system. The actual combustibles analyzer is compact and is compactly enclosed within a flat watch case shaped vacuum enclosure of minimum size having a removable back much larger in comparison to the space within the enclosure than is the removable back 51 shown in Figure IV. Apparatus for analyzing gas contaminated with free moisture and finely divided solids embodying the invention is very satisfactory using a primary vacuum enclosure of about eighteen inches in diameter and about 12 inches deep.

Various modifications may be made in specific details of construction without departing from the spirit and scope of the invention.

Having described the invention, we claim:

1. An apparatus for analyzing a gas containing uncondensed water vapor and contaminated with free moisture and finely divided solids comprising, in combination, a sampling line connected to a supply of the gas to be analyzed, an eliminator of nongaseous contaminants, said eliminator being connected to said sampling line and separating out such nongaseous contaminants by utilizing their greater inertia, a moisture trap connected below said eliminator, a filter connected in series with said eliminator for receiving gas therefrom and removing finely divided solids from the gas, means for heating the gas passing through said filter at a temperature above the dewpoint of the gas, an analyzer connected by means of a conduit to said filter to receive from said filter the decontaminated gas while so heated above its dewpoint, an electrically operated valve to close and open said conduit, a thermoswitch incorporated with said filter and electrically connected to said electrically operated valve to cause said valve to close said conduit when the temperature within said filter is below the dewpoint of the gas, said analyzer being adapted to analyze the gas with its content of uncondensed water vapor remaining therein, and means for moving the gas successively through said sampling line, said eliminator, said filter and said analyzer.

2. An apparatus as claimed in claim 1 wherein the means for heating the gas passing through said filter comprises an electric heater.

3. An apparatus for analyzing a gas containing uncondensed water vapor and contaminated with free moisture and finely divided solids comprising, in combination, a sampling line connected to a supply of the gas to be analyzed, an eliminator of nongaseous contaminants connected to said sampling line, said eliminator separating out such nongaseous contaminants by utilizing their greater inertia, a moisture trap connected below said eliminator, a filter connected in series with said eliminator for receiving gas therefrom and removing finely divided solids from the gas, means for heating the gas passing through said filter at a temperature above the dewpoint of the gas, a shutoff valve connected to an outlet of said filter, electrical sensing means located in the moisture trap for causing the shutoff valve to be closed if the water in the trap reaches a predetermined level to activate said sensing means, an analyzer connected to said shutoff valve to receive therefrom the decontaminated gas while so heated above its dewpoint, said analyzer being adapted to analyze the gas with its content of uncondensed water vapor remaining therein, and means for moving the gas successively through said sampling line, said eliminator, said filter, said shutoff valve and said analyzer.

4. An apparatus for analyzing a gas containing uncondensed water vapor and contaminated with free moisture and finely divided solids comprising, in combination, a sampling line connected to a supply of the gas to be analyzed, a filter connected in said sampling line for removing finely divided solids from the gas, a heater incorporated with said filter for heating the gas passing through said filter to a control temperature above the dewpoint of the gas, a shutoff valve connected to the outlet of said filter, electrical control means located in the filter for preventing opening of the shutoff valve until said filter is heated to the control temperature, an analyzer connected to said filter to receive from said filter the decontaminated gas while so heated above its dewpoint, said analyzer being adapted to analyze the gas with its content of uncondensed water vapor remaining therein and means for moving the gas successively through said sampling line, said filter, said shutoff valve and said analyzer.

5. In apparatus for analyzing a gas contaminated with free moisture and finely divided solids, a sampling system comprising, in combination, a sampling line connected to a supply of the gas to be analyzed, an eliminator of nongaseous contaminants connected to the sampling line, a moisture trap connected below the eliminator, a filter connected to the eliminator for removing finely divided solids from the gas, means for heating the gas passing through the system to a temperature above the dew point of the gas, a shutoff valve connected to the filter, a metering element for measuring the flow of gas passing through the system, switch means connected to the metering element for causing the shutoff valve to be closed if the gas flow as measured by the metering element drops below a minimum level, and means for moving the gas through the sampling line, eliminator, filter and shutoff valve.

6. In apparatus for analyzing a gas contaminated with free moisture and finely divided solids, a sampling system comprising, in combination, a sampling line connected to a supply of the gas to be analyzed, an eliminator of nongaseous contaminants, said eliminator being connected to the sampling line, a moisture trap connected below the eliminator, a filter connected to the eliminator for removing finely divided solids from the gas, means for heating the gas passing through the system to a control temperature above the dew point of the gas comprising a heater for the filter, a shutoff valve connected to the filter, electrical control means located in the filter for preventing opening of the shutoff valve until the filter is heated to the control temperature, electrical sensing means located in the moisture trap for causing the shutoff valve to be closed if the water level in the trap covers the sensing means, a metering element for measuring the flow of gas passing through the system, switch means connected to the metering element for causing the shutoff valve to be closed if the gas flow as measured by the metering element drops below a minimum level, and means for moving the gas through the sampling line, eliminator, filter and shutoff valve.

7. An apparatus for analyzing a gas containing uncondensed water vapor and contaminated with free moisture and finely divided solids comprising, in combination, a sampling line connected to a supply of the gas to be analyzed, a purifying system connected to the sampling line for removing solids from the gas and for heating the gas to a temperature above its dew point, an analyzer comprising a sample chamber connected to the purifying system and having a pressure regulating valve for maintaining a constant pressure therein, a combustion tube connected to receive a constant flow of the gas from said sample chamber, and means for forming a combustible mixture from the gas in said combustion tube, a vacuum chamber containing said analyzer, and a vacuum pump connected to said vacuum chamber, whereby said analyzer is caused to function within an environment of reduced pressure.

8. An apparatus as claimed in claim 7 wherein said pump is an eductor.

9. An apparatus as claimed in claim 7 having means for momentarily opening said vacuum system to the atmosphere in the event of an explosion.

10. An apparatus for analyzing a gas containing uncondensed water vapor and contaminated with free moisture and finely divided solids comprising, in combination, a sampling line connected to a supply of the gas to be analyzed, a purifying system connected to the sampling line for removing solids from the gas and for heating the purified gas to a temperature above its dew point, an analyzer comprising means for supplying a constant flow of air about said analyzer, a sample chamber connected to said purifying system and having at least one pressure regulating valve for maintaining a constant pressure therein, a combustion tube connected to receive a constant flow of the gas from said sample chamber, and means for forming a combustible mixture from the gas in said combustion tube, a vacuum enclosure surrounding said analyzer and a vacuum pump connected to said vacuum enclosure.

11. An apparatus for analyzing a gas containing uncondensed water vapor and contaminated with free moisture and finely divided solids comprising, in combination, a sampling line connected to a supply of the gas to be analyzed, a purifying system connected to the sampling line, said purifying system being constructed and arranged for removing free moisture and solids from the gas and for retaining undiminished the uncondensed water vapor content of the gas, means for heating the gas to a temperature above its dew point, a sample chamber connected to said purifying system and having at least one pressure regulating valve for maintaining a constant pressure therein, a combustion tube connected to receive a constant flow of the gas from said sample chamber, means for forming a combustible mixture from the gas in said combustion tube, a primary vacuum enclosure surrounding said sample chamber and its pressure regulating valve, said combustion tube and said means for forming a combustible mixture, means for supplying a constant flow of air to said primary vacuum enclosure, a secondary vacuum enclosure within said primary enclosure and surrounding said sample chamber and its regulating valve and connected to said combustion tube, said secondary vacuum enclosure being open to said primary vacuum enclosure to exhaust gases therefrom, and a vacuum pump connected to said secondary enclosure.

12. An apparatus as claimed in claim 11 having means for momentarily opening said primary vacuum enclosure to the atmosphere and for momentarily opening said secondary vacuum enclosure to said primary vacuum enclosure in the event of an explosion.

13. An apparatus for analyzing a gas containing uncondensed water vapor and contaminated with free moisture and finely divided solids comprising, in combination, a sampling line connected to a supply of the gas to be analyzed, a purifying system connected to the sampling line, said purifying system being constructed and arranged for removing free moisture and solids from the gas and for retaining undiminished the uncondensed moisture content thereof, means for heating the gas to a temperature above its dew point, a vacuum enclosure, an analyzer mounted within the vacuum enclosure comprising a sample chamber connected to said purifying system and having at least one pressure regulating valve for maintaining a constant pressure therein, a combustion tube connected to receive a constant flow of the gas from said sample chamber, means for forming a combustible mixture from the gas in said combustion tube, and a discharge tube connected to said combustion tube, means for supplying a constant flow of air to said vacuum enclosure, a hood surrounding said sample chamber and its regulating valve and communicating with said discharge tube, an exhauster connected to said hood, a vacuum pump connected to said exhauster to draw gases from said hood, and a vent in hood for exhausting gases from said vacuum enclosure, said vent being of a size such that the pressures within and without said hood are identical.

14. An apparatus as claimed in claim 13 wherein said pump is an eductor.

15. An apparatus as claimed in claim 13 having means for momentarily opening said vacuum enclosure to the atmosphere and for momentarily opening said hood to the said vacuum enclosure in the event of an explosion.

16. An apparatus for analyzing a gas containing uncondensed water vapor and contaminated with free moisture and finely divided solids comprising, in combination, a sampling line connected to a supply of the gas to be analyzed, an eliminator of nongaseous contaminants, said eliminator being connected to said sampling line and separating out such nongaseous contaminants by utilizing their greater inertia, a moisture trap connected below the eliminator, a filter connected in series with said eliminator for receiving gas therefrom and removing finely divided solids from the gas, means for heating the gas passing through said filter to a temperature above the dew point of the gas, an analyzer connected to said filter to receive from said filter the decontaminated gas while so heated above its dewpoint, said analyzer being adapted to analyze the gas with its content of uncondensed water vapor remaining therein, a pump for creating a vacuum to draw the gas successively through said sampling line, said eliminator, said filter and said analyzer, an electrically operated valve adapted (when closed) to prevent the gas from passing through said filter and said analyzer and a thermoswitch incorporated with said filter to cause said electrically operated valve to close when the temperature within said filter falls below the dewpoint of said gas.

17. An apparatus for analyzing a gas containing uncondensed water vapor and contaminated with free moisture and finely divided solids comprising in combination, a sampling line connected to a supply of the gas to be analyzed, a purifying system connected to the sampling line for removing solids from the gas and for heating the gas to a temperature above its dew point, an analyzer comprising a sample chamber connected to the purifying system, a combustion tube connected to receive a constant flow of the gas from said sample chamber, means for forming a combustible mixture from the gas in said combustion tube, a vacuum chamber containing said analyzer, and vacuum pump means connected to said vacuum chamber for maintaining the same at a reduced pressure.

References Cited in the file of this patent
UNITED STATES PATENTS

| | | |
|---|---|---|
| 1,476,484 | Bramblett | Dec. 4, 1923 |
| 1,880,720 | Blackwood et al. | Oct. 4, 1932 |
| 1,935,305 | West | Nov. 14, 1933 |
| 2,083,522 | Morgan | June 8, 1937 |
| 2,114,383 | Jacobson | Apr. 19, 1938 |
| 2,358,285 | Johnson | Sept. 12, 1944 |
| 2,671,527 | Moon | Mar. 9, 1954 |